(12) United States Patent
Yachin et al.

(10) Patent No.: US 11,660,518 B2
(45) Date of Patent: May 30, 2023

(54) MARTIAL ARTS EQUIPMENT, SYSTEMS AND RELATED METHODS

(71) Applicant: LUDUS MATERIALS LTD., Givat Brenner (IL)

(72) Inventors: Nir Yachin, Givat Brenner (IL); Amit Kinor, Givat Brenner (IL)

(*) Notice: Subject to any disclaimer, the term of this patent is extended or adjusted under 35 U.S.C. 154(b) by 195 days.

(21) Appl. No.: 15/930,460

(22) Filed: May 13, 2020

(65) Prior Publication Data
US 2020/0269115 A1    Aug. 27, 2020

Related U.S. Application Data

(62) Division of application No. 15/761,097, filed as application No. PCT/IL2016/051026 on Sep. 15, 2016, now Pat. No. 10,668,349.

(60) Provisional application No. 62/221,228, filed on Sep. 21, 2015, provisional application No. 62/219,701, filed on Sep. 17, 2015.

(51) Int. Cl.
| | |
|---|---|
| *A63B 69/32* | (2006.01) |
| *G09B 19/00* | (2006.01) |
| *A63B 69/00* | (2006.01) |
| *A63B 71/06* | (2006.01) |

(52) U.S. Cl.
CPC ............ *A63B 69/32* (2013.01); *A63B 69/004* (2013.01); *A63B 71/0622* (2013.01); *G09B 19/0038* (2013.01); *A63B 2071/0625* (2013.01); *A63B 2071/0633* (2013.01); *A63B 2071/0663* (2013.01); *A63B 2209/00* (2013.01); *A63B 2220/53* (2013.01); *A63B 2220/62* (2013.01); *A63B 2220/73* (2013.01); *A63B 2225/50* (2013.01); *A63B 2225/74* (2020.08); *A63B 2244/10* (2013.01); *A63B 2244/102* (2013.01)

(58) Field of Classification Search
CPC .......... A63B 69/004; A63B 69/20–345; A63B 2069/0042–0044
See application file for complete search history.

(56) References Cited

U.S. PATENT DOCUMENTS

| | | | |
|---|---|---|---|
| 7,402,743 B2 | 7/2008 | Clarck et al. | |
| 9,498,693 B1 | 11/2016 | Kraus | |
| 9,579,048 B2 | 2/2017 | Rayner et al. | |
| 2003/0217582 A1 | 11/2003 | Reinbold | |
| 2008/0174548 A1* | 7/2008 | Jones | A63B 24/0062 345/156 |
| 2010/0009810 A1* | 1/2010 | Trzecieski | G16H 20/30 482/8 |
| 2010/0307222 A1* | 12/2010 | Oberleitner | A63B 69/32 73/12.04 |
| 2011/0021326 A1 | 1/2011 | Oh | |
| 2012/0108394 A1 | 5/2012 | Jones et al. | |
| 2012/0206330 A1 | 8/2012 | Cao et al. | |
| 2012/0238407 A1 | 9/2012 | Dilworth et al. | |

(Continued)

FOREIGN PATENT DOCUMENTS

| | | |
|---|---|---|
| CN | 202961795 | 6/2013 |
| CN | 204522207 | 8/2015 |

(Continued)

*Primary Examiner* — Jennifer Robertson
(74) *Attorney, Agent, or Firm* — JMB Davis Ben-David

(57) ABSTRACT

A martial arts training system comprising: (a) one or more hand held targets; (b) one or more wearable devices; and (c) trainee log-in hardware installed in said target(s) and said wearable device(s).

5 Claims, 7 Drawing Sheets

(56) References Cited

U.S. PATENT DOCUMENTS

| | | |
|---|---|---|
| 2013/0302768 A1 | 11/2013 | Webb |
| 2014/0172313 A1 | 6/2014 | Rayner |
| 2014/0248591 A1 | 9/2014 | Navas |
| 2014/0248594 A1 | 9/2014 | Navas |
| 2015/0077234 A1 | 3/2015 | Fullam |
| 2017/0319931 A1 | 11/2017 | Yachin |

FOREIGN PATENT DOCUMENTS

| | | |
|---|---|---|
| EP | 2025370 A1 | 2/2009 |
| JP | 2005-533588 A | 11/2005 |
| KR | 20-0245616 | 10/2001 |
| KR | 10-2010-0024162 A | 3/2010 |
| KR | 20130000922 | 2/2013 |
| KR | 20130085868 A | 7/2013 |
| KR | 101465334 | 11/2014 |
| RU | 145881 U1 | 9/2014 |
| WO | 2006/099320 | 9/2006 |
| WO | 2012/024060 | 2/2012 |
| WO | 2015/186132 A2 | 12/2015 |

\* cited by examiner

Fig. 2b1
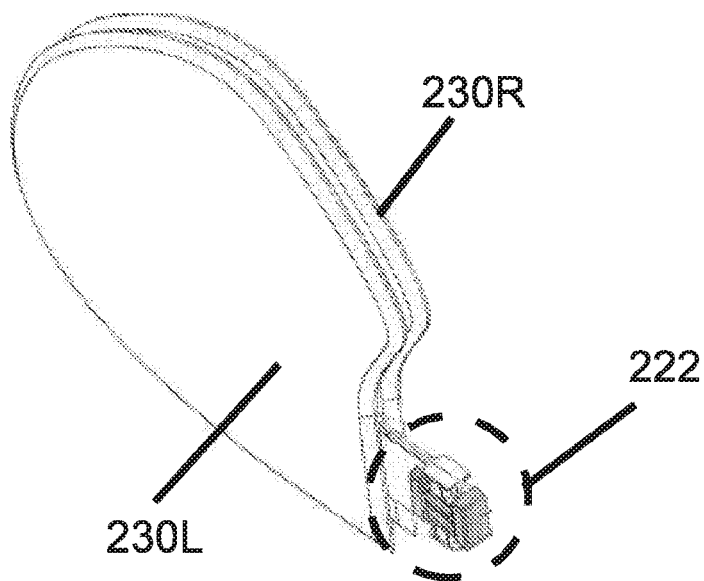
Fig. 2b2
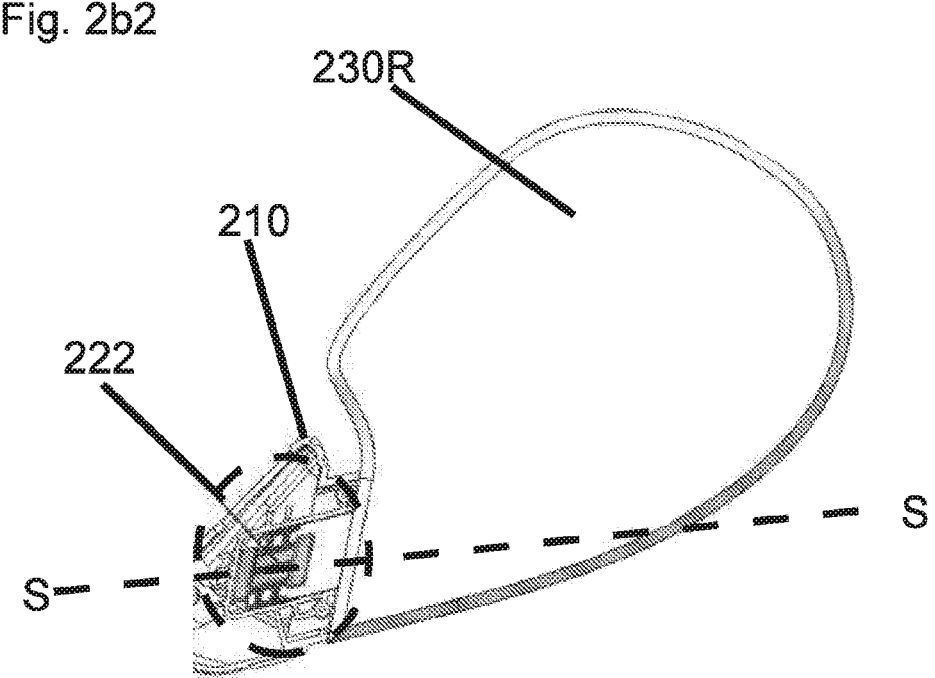

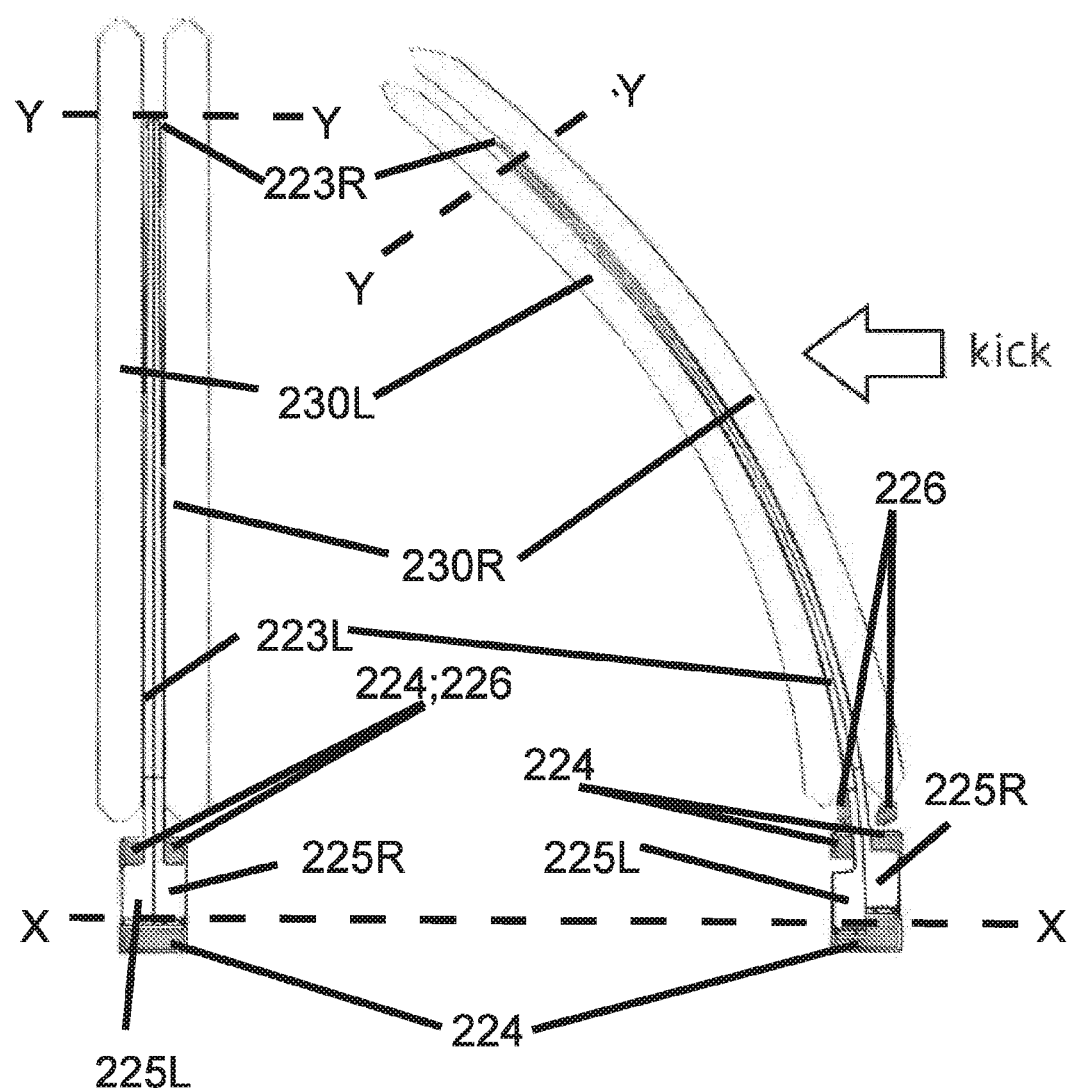

Fig. 4

400 transmit altimeter and accelerometer data to a memory associated with a CPU residing in a hand held target (410)

↓ store the data in a log file (420)

↓ associate the log file with a trainee identity acquired by registration hardware installed in the hand held target to create a trainee log file (430)

↓ transmit the trainee log file to an external device (440)

MARTIAL ARTS EQUIPMENT, SYSTEMS AND RELATED METHODS

CROSS-REFERENCE TO RELATED APPLICATIONS

This is a divisional application of U.S. Ser. No. 15/761,097, filed Mar. 18, 2018 and; U.S. Ser. No. 15/761,097 was a U.S. National Stage of International Patent Application No. PCT/IL2016/051026 filed Sep. 15, 2016, which was published in English under PCT Article 21(2), and which in turn claimed the benefit of United States Provisional Patent Application Nos. 62/219,701 filed Sep. 17, 2015 and 62/221,228 filed Sep. 21, 2015; Each of these earlier applications is fully incorporated herein by reference.

FIELD OF THE INVENTION

The various described embodiments are in the field of martial arts training.

BACKGROUND OF THE INVENTION

In we kwon do it is common for a trainer or coach to use a hand held paddle as a target. The student or trainee attempts to kick the paddle as it is raised, lowered and moved from side to side by the trainer or coach.

SUMMARY OF THE INVENTION

One aspect of some embodiments of the invention relates to a modular tae kwon do paddle. In some embodiments the handle is provided separately from the strike-target portion of the paddle. Alternatively or additionally, in some embodiments hardware for log-in of a trainee and/or log-in of trainee performance parameters during a workout are housed in the handle. According to various exemplary embodiments of the invention the hardware includes an accelerometer and/or altimeter and/or CPU and/or power source (e.g. a battery). In some embodiments a user interface for the trainer is housed in the handle. In some embodiments a waveguide (e.g. optical fiber) protrudes from the handle. Optionally, the waveguide conducts light to a display on the target when the paddle is connected to the handle.

According to another aspect of some embodiments of the invention a strain relief mechanism is positioned between the handle and the target of a tae kwon do paddle. According to various exemplary embodiments of the invention the strain relief mechanism includes a spring and/or a hinge and/or a flexible polymer. In various embodiments of the invention the strain relief mechanism is provided separately, as part of a handle adapted for connection to a strike-target, as part of a strike-target adapted for connection to a handle, or as an integral part of a fully assembled we kwon do paddle.

According to another aspect of some embodiments of the invention a hand held martial arts target is equipped with hardware that logs-in a trainee for a training session. According to these embodiments, trainees are provided with wearable devices adapted to communicate with the hardware that logs in a trainee. According to various exemplary embodiments of the invention the hardware for logging in a trainee relies on NFC (near field contact), IR (Infra-red), RF (Radio Frequency), Bluetooth or a physical connection. Alternatively or additionally, in some embodiments hardware for logging of trainee performance parameters during a workout is housed in the handle. According to various exemplary embodiments of the invention the logging hardware includes an accelerometer and/or altimeter and/or CPU and/or power source (e.g. a battery). Alternatively or additionally, in some embodiments a hand held martial arts target includes a data link to a remote device. According to the embodiments, log files concerning trainee performance during a training session are transmitted to the remote device.

According to another aspect of some embodiments of the invention a method includes transmitting altimeter and accelerometer data to a memory associated with a CPU residing in a hand held target; storing the data in a log file; associating the log file with a user identity acquired by trainee log-in hardware installed in the hand held target to create a user log file; and transmitting the user log file to an external device.

It will be appreciated that the various aspects described above relate to solution of technical problems associated with objective evaluation of trainee performance during a martial arts training session.

Alternatively or additionally, it will be appreciated that the various aspects described above relate to solution of technical problems related to breakage of we kwon do paddle handles and/or reduction of wrist injuries among trainers that hold we kwon do paddles for trainees during a workout.

In some exemplary embodiments of the invention there is provided a martial arts target handle including; (a) an accelerometer providing a first data output signal; (b) an altimeter providing a second data output signal; (c) a CPU receiving and storing the first and second data output signals; and (d) a power source providing power the accelerometer, altimeter and CPU.ISE the handle includes a connector to a strike-target. Alternatively or additionally, in some embodiments the handle is integrally formed with or connected to a strike target. AIAISE the handle includes a display. Alternatively or additionally, in some embodiments the handle includes a wave guide extending from the handle. Alternatively or additionally, in some embodiments the handle includes a connector compatible with an external charging source. Alternatively or additionally, in some embodiments the CPU includes a clock and a time stamp module adapted to apply a time stamp to the first data output signal and the second data output signal. Alternatively or additionally, in some embodiments the handle includes a user interface positioned to receive commands from a hand holding the handle.

In some exemplary embodiments of the invention there is provided a martial arts target including: (a) a handle; (b) a strike-target; and (c) a strain relief mechanism positioned between the handle and the strike target. In some embodiments the strain relief mechanism includes a spring. Alternatively or additionally, in some embodiments the strain relief mechanism includes a hinge. Alternatively or additionally, in some embodiments the strain relief mechanism includes a polymer having a 10% compression value (ISO 844) between 105 kPA and 347 kPA. Alternatively or additionally, in some embodiments the strain relief mechanism includes two pieces that slide against one another.

In some exemplary embodiments of the invention there is provided a martial arts training system including: (a) one or more hand held targets; (b) one or more wearable devices; and (c) trainee log-in hardware installed in the target(s) and the wearable device(s). In some embodiments the trainee log-in hardware includes near field contact (NFC) hardware. In some embodiments active NFC hardware is installed in the target(s) and passive NFC hardware is installed in the wearable device(s). Alternatively or additionally, in some embodiments passive NFC hardware is installed in the target(s) and active NFC hardware is installed in the wearable device(s). Alternatively or additionally, in some embodiments the target(s) include communication hardware that opens a channel of communication to an external data processing device.

In some exemplary embodiments of the invention there is provided a method including: (a) transmitting altimeter and accelerometer data to a memory associated with a CPU residing in a hand held target; (b) storing the data in a log file; (c) associating the log file with a trainee identity acquired by log-in hardware installed in the hand held target to create a trainee log file; and (d) transmitting the trainee log file to an external device. According to various exemplary embodiments of the invention the external device is external to the hand held target and/or to the system. In some embodiments the transmitting the trainee log file to an external device relies on at least one member of the group consisting of NFC (near field contact), IR (Infra-red), RF (Radio Frequency), Wi-Fi, 3G, 4G, LTE, Bluetooth and a physical connection. Alternatively or additionally, in some embodiments the memory associated with the CPU includes an integral memory. Alternatively or additionally, in some embodiments the memory associated with the CPU includes a connectable memory. Alternatively or additionally, in some embodiments the external device is a wearable device. Alternatively or additionally, in some embodiments the associating includes applying a time stamp to the log file. Alternatively or additionally, in some embodiments the associating includes assembling two or more log files belonging to a single trainee into a composite trainee log file.

Unless otherwise defined, all technical and scientific terms used herein have the same meaning as commonly understood by one of ordinary skill in the art to which this invention belongs. Although suitable methods and materials are described below, methods and materials similar or equivalent to those described herein can be used in the practice of the present invention. In case of conflict, the patent specification, including definitions, will control. All materials, methods, and examples are illustrative only and are not intended to be limiting.

As used herein, the terms "comprising" and "including" or grammatical variants thereof are to be taken as specifying inclusion of the stated features, integers, actions or components without precluding the addition of one or more additional features, integers, actions, components or groups thereof. This term is broader than, and includes the terms "consisting of" and "consisting essentially of" as defined by the Manual of Patent Examination Procedure of the United States Patent and Trademark Office. Thus, any recitation that an embodiment "includes" or "comprises" a feature is a specific statement that sub embodiments "consist essentially of" and/or "consist of" the recited feature.

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

The phrase "adapted to" as used in this specification and the accompanying claims imposes additional structural limitations on a previously recited component.

The term "method" refers to manners, means, techniques and procedures for accomplishing a given task including, but not limited to, those manners, means, techniques and procedures either known to, or readily developed from known manners, means, techniques and procedures by practitioners of architecture and/or computer science.

Implementation of the method and system according to embodiments of the invention involves performing or completing selected tasks or steps manually, automatically, or a combination thereof. Moreover, according to actual instrumentation and equipment of exemplary embodiments of methods, apparatus and systems of the invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

In order to understand the invention and to see how it may be carried out in practice, embodiments will now be described, by way of non-limiting example only, with reference to the accompanying figures. In the figures, identical and similar structures, elements or parts thereof that appear in more than one figure are generally labeled with the same or similar references in the figures in which they appear. Dimensions of components and features shown in the figures are chosen primarily for convenience and clarity of presentation and are not necessarily to scale. The attached figures are:

FIG. 2b1 is a schematic representation of a strain relief mechanism of a martial arts target according to some exemplary embodiments of the invention in conjunction with a strike target;

FIG. 2b2 is a schematic representation of a strain relief mechanism of a martial arts target according to some exemplary embodiments of the invention in conjunction with a strike target and a handle;

FIG. 2d1 is a top view of a strain relief mechanism in conjunction with a strike target according to some exemplary embodiments of the invention in a first operational state;

FIG. 2d2 is a top view of a strain relief mechanism in conjunction with a strike target according to some exemplary embodiments of the invention in a second operational state;

FIG. 4 is a simplified flow diagram of a method according to some exemplary embodiments of the invention.

DETAILED DESCRIPTION OF EMBODIMENTS

Embodiments of the invention relate to hand held martial arts targets (e.g. we kwon do paddles), portions thereof, and systems including such targets and methods which use such targets.

Specifically, some embodiments of the invention can be used to log data from a trainee workout and/or contribute to a reduction to wear and tear on the target and/or contribute to a reduction in force transmitted to a hand holding the target.

The principles and operation of hand held martial arts targets (e.g. we kwon do paddles), portions thereof, systems including such targets and methods which use such targets according to exemplary embodiments of the invention may be better understood with reference to the drawings and accompanying descriptions.

Before explaining at least one embodiment of the invention in detail, it is to be understood that the invention is not limited in its application to the details set forth in the following description or exemplified by the Examples. The invention is capable of other embodiments or of being practiced or carried out in various ways. Also, it is to be understood that the phraseology and terminology employed herein is for the purpose of description and should not be regarded as limiting.

Exemplary Handle

Figure 1:
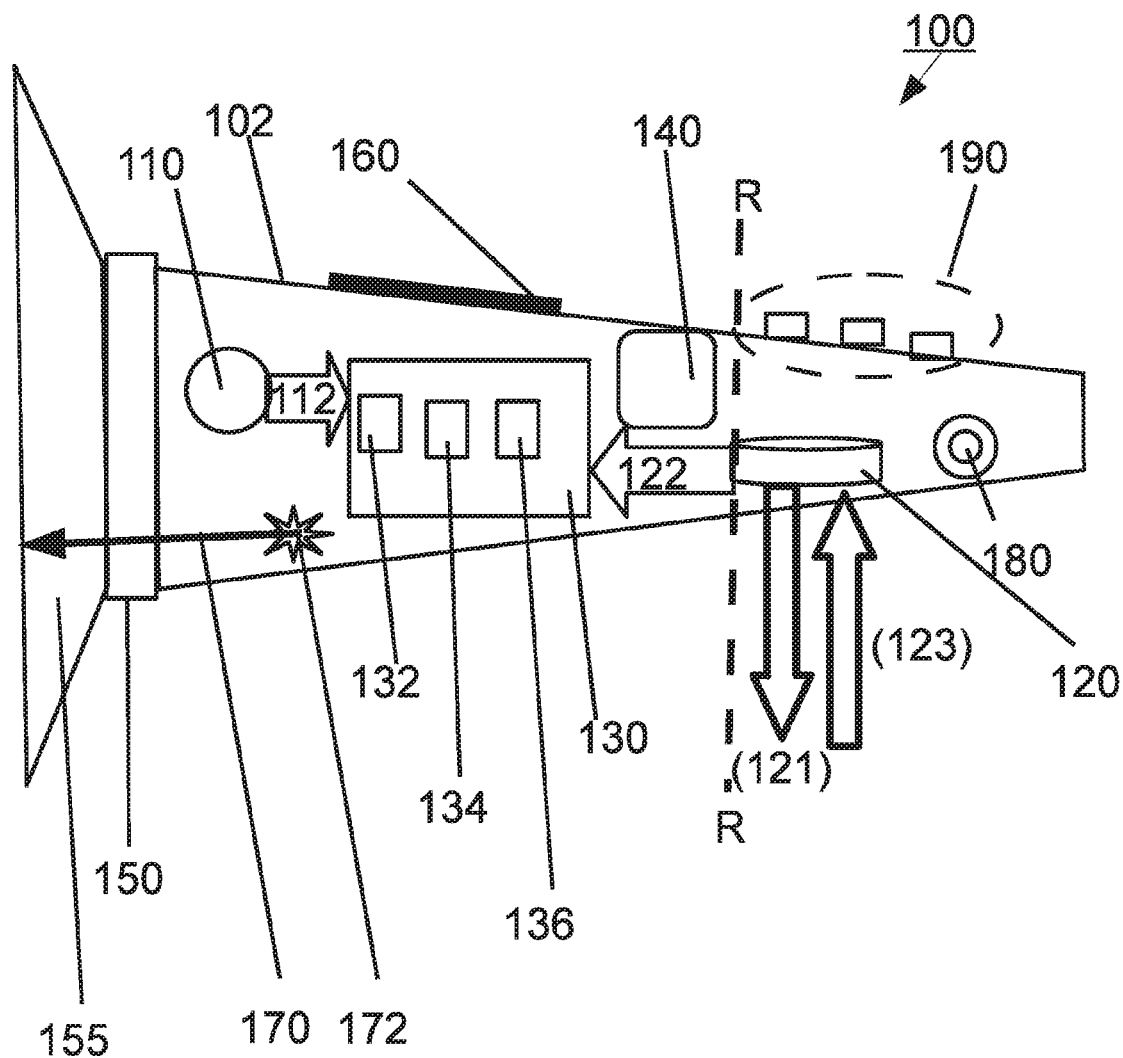
FIG. 1 is a schematic representation of a handle of a martial arts target according to some exemplary embodiments of the invention.

FIG. 1 is a schematic representation of a handle of a martial arts target, indicated generally as 100, according to some exemplary embodiments of the invention. For purposes of this specification and the accompanying claims, the term "handle" indicates that the entire target is a hand held device. This definition excludes pole mounted or platform mounted devices.

Depicted exemplary handle 100 includes a main body 102 containing electronics components that act in concert to gather data pertaining to trainee performance during a workout.

In the depicted embodiment, one electronics component is an accelerometer 110 providing a first data output signal 112. Signal 112 indicates strike force of a blow delivered to a strike target.

In the depicted embodiment, another electronics component is an altimeter 120 providing a second data output signal 122. In some embodiments altimeter function is provided by an ultrasonic transducer. In other exemplary embodiments of the invention, altimeter function is provided by a laser range finder. In some embodiments the altimeter is positioned in the handle so that it can send a signal 121 to, and receive a reflection 123 of that signal from, the floor. In the depicted embodiment, handle 120 is equipped with a rotation mechanism (indicated as dashed line R-R). According to the depicted embodiment, the trainer grasps the handle on the opposite side of line R-R from altimeter 120. The rear portion of the handle containing altimeter 120 rotates at line R-R so that signal 121 is aimed perpendicular to the floor. In some embodiments the weight of altimeter 120 is sufficient to cause the rotation at R-R. In other exemplary embodiments of the invention, an additional weight (not depicted) is installed to insure appropriate rotation.

In the depicted embodiment, CPU 130 receives and stores first and second data output signals 112 and 122. In some embodiments storage is in memory 132. Alternatively or additionally, in the depicted embodiment a power source (depicted as battery 140) provides power to accelerometer 110, altimeter 120 and CPU 130. In some exemplary embodiments of the invention, CPU 130 includes a clock 134 and a time stamp module 136 adapted to apply a time stamp to first data output signal 112 and second data output signal 122. In some exemplary embodiments of the invention, the time stamped signals are stored in memory 132. In some embodiments handle 100 includes a connector 150 to a strike-target (partially depicted as 155). In some embodiments handle 100 is integrally formed with or connected to a strike target (partially depicted as 155).

In the depicted embodiment, handle 100 includes a display 160. According to various exemplary embodiments of the invention display 160 includes an LCD panel and/or LCD indicators and/or an audio output device such as a buzzer or bell.

In the depicted embodiment, handle 100 includes one or more wave guides 170 extending from the handle. In the depicted embodiment, handle 100 includes one or more light sources 172. In some embodiments wave guide 170 is provided as an optical fiber. In some embodiments the wave guide conducts light to one or more trainee facing displays (not depicted) in strike target 155. For example, in some embodiments target 155 has a left trainee facing display and a right trainee facing display. In some embodiments the trainee facing display comprises a translucent or transparent panel which is visibly brighter when light from source 172 propagates through wave guide 170 (e.g. an optical fiber).

In the depicted embodiment, handle 100 includes a connector 180 compatible with an external charging source. According to various exemplary embodiments of the invention connector 180 is configured as a USB port or a DC jack. Connection of connector 180 to the external power source charges power supply 140.

Alternatively or additionally, in some embodiments handle 100 includes a user interface 190 positioned to receive commands from a hand holding the handle. According to various exemplary embodiments of the invention interface 190 includes a touch screen and/or pushbuttons and/or switches. In some embodiments user interface 190 is configured to accept a small number of input commands (e.g. left kick, right kick and a set of predefined combinations (e.g. Left/Left; Left/Right; Right/Left and Right/Right). In some embodiments use of interface 190 contributes to a reduction in vocal commands from the trainer to the trainee. Alternatively or additionally, in some embodiments input of a command via user interface 190 operates a light 172 causing light to propagate through a wave guide 170 to a trainee facing display.

In some embodiments an input received at 190 is time stamped by time stamp module 136 and stored in memory 132. This practice contributes to an ability to evaluate a trainee in terms of delay between trainer input received at interface 190 and impact of a kick as registered by accelerometer 110 (which is also time stamped). Alternatively or additionally, this practice contributes to an ability to evaluate a trainee in terms of height (altitude) of a kick as indicated by signal 122 of altimeter 120 (which is also time stamped) for each trainer input received at interface 190.

Exemplary Hand Held Martial Arts Target

Figure 2A:
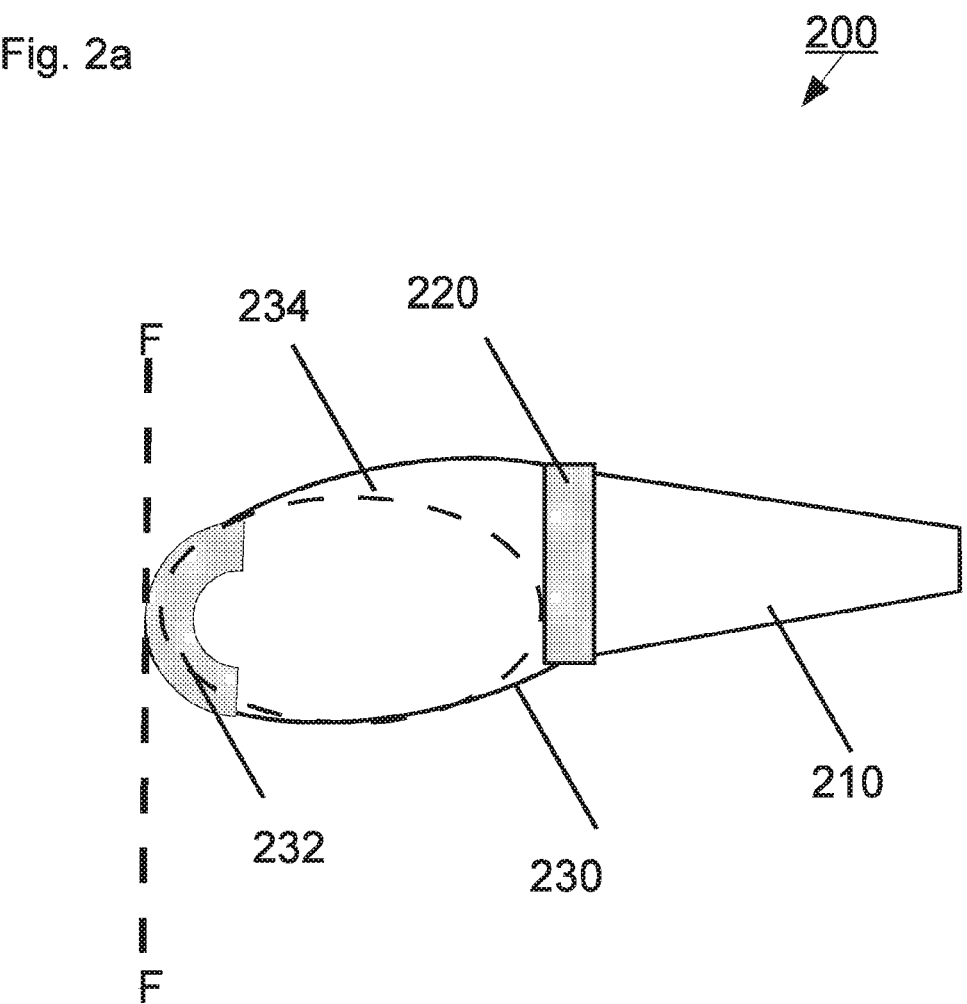
FIG. 2a is a schematic representation of a martial arts target according to some exemplary embodiments of the invention.

FIG. 2a is a schematic representation of a martial arts target, indicated generally as 200, according to some exemplary embodiments of the invention. In some embodiments martial arts target 200 is configured as a we kwon do paddle. Depicted exemplary target 200 includes a handle 210, a strike-target 230 and a strain relief mechanism 220 positioned between handle 210 and strike target 230.

In some embodiments strike target 230 is padded. Alternatively or additionally, in some embodiments strike target 230 includes one or more trainee facing displays 232. In FIG. 2a one trainee facing display 232 is visible on the front side of strike target 230. In many embodiments, a corresponding trainee facing display is present on the opposite (back) side of strike target 230. In some embodiments display(s) 232 are lighted by light propagated from a light source 172 through a wave guide 170 (See FIG. 1 and explanation above). In some embodiments at least a portion of the light is visually perceptible to a trainee standing on the opposite side of line F-F relative to strike target 230.

In some embodiments strain relief mechanism 220 includes a spring (not depicted). According to various exemplary embodiments of the invention the spring includes a leaf spring portion and/or a coil spring portion. The spring is configured and positioned to allow strike target 230 to move from side to side relative to handle 210 in response to an impact received at impact zone 234.

Alternatively or additionally, in some embodiments strain relief mechanism 220 includes a hinge (not depicted). In some embodiments the hinge is configured and positioned to define a maximum side to side range of motion for strike target 230 relative to handle 210 in response to an impact received at impact zone 234.

Alternatively or additionally, in some embodiments strain relief mechanism 220 includes a flexible polymer.

Strain relief mechanism 220 contributes to a reduction in wear and tear and/or breakage of target 200 and/or injuries to the hand and/or wrist of a trainer holding handle 210.

Exemplary Strain Relief Mechanism

FIGS. 2*b*1, 2*b*2, 2*c*, 2*d*1 and 2*d*2 illustrate a strain relief mechanism of a martial arts target, indicated generally as 222 according to some exemplary embodiments of the invention. Mechanism 222 is one exemplary way to provide mechanism 220 in FIG. 2*a*.

FIG. 2*b*1 is a schematic representation of a strain relief mechanism, indicated generally as 222, of a martial arts target according to some exemplary embodiments of the invention. This perspective view shows mechanism 222 in conjunction with a strike target 230 having a right half (230R) and a left half (230L).

FIG. 2*b*2 is a schematic representation of exemplary strain relief mechanism 222 in conjunction with a strike target (Right half 230R is visible in the figure) and a handle 210.

Figure 2C:
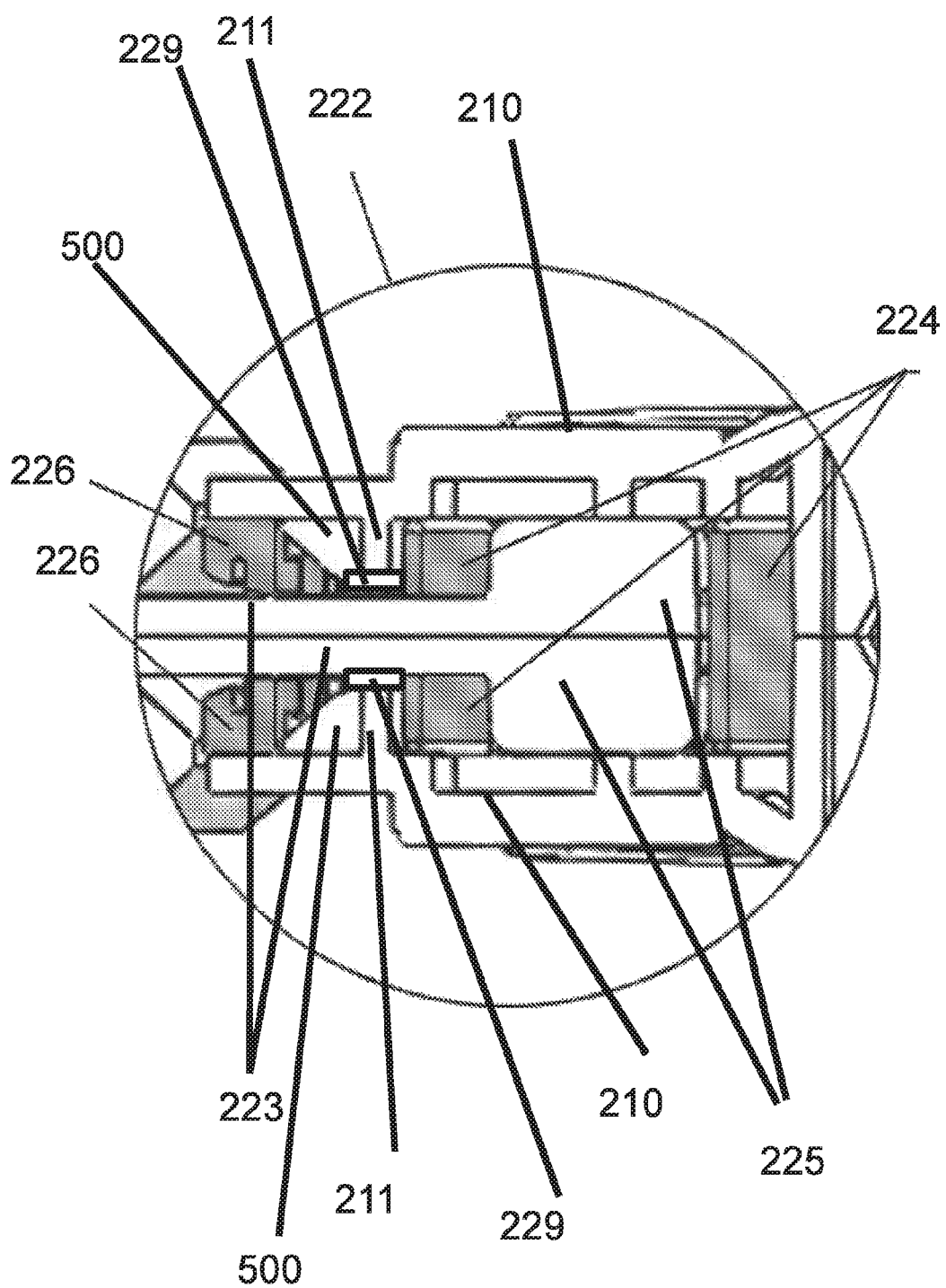
FIG. 2c is cross sectional view of the strain relief mechanism of FIG. 2b2 through line S-S enlarged to show detail.

FIG. 2*c* is cross sectional view of strain relief mechanism 222 of FIG. 2*b*2 through line S-S enlarged to show detail. Depicted exemplary strain release mechanism 222 is depicted assembled between two halves of handle 210. In the depicted embodiment, retention and engagement by the handle contributes to function of the mechanism.

Depicted exemplary strain release mechanism 222 includes two plates 223, each of which has a plate foot 225 at the terminus installed in handle 210.

Plates 223 protrude from handle 210 and extend between right strike target 230R and left strike target 230L (see FIG. 2*b*1).

In the depicted embodiment, plate feet 225 are engaged and retained by elastomeric shoes 224. Shoes 224 are, in turn, engaged and retained by the two halves of handle 210.

In the depicted embodiment, the two halves of handle 210 each include a protrusion 211 extending inwardly towards plates 223. In the depicted embodiment, there is a space 229 between each protrusion 211 and plate 223. In some embodiments spaces 229 contribute to the function of mechanism 222.

Depicted exemplary mechanism 222 includes plate movement governors 226 attached to the inner wall of handle 210. According to various exemplary embodiments of the invention plate movement governors 226 include springs and/or blocks of elastomeric material. Alternatively or additionally, in some embodiments mechanism 222 includes a support rib 500 in the area of resistance.

FIGS. 2*d*1 and 2*d*2 are top views of strain relief mechanism 222 in conjunction with a strike target in two different operational states. FIG. 2*d*1 shows mechanism 222 at rest and FIG. 2*d*2 shoes mechanism 222 responding to a kick or other blow as indicated by leftward facing white arrow.

In FIG. 2*d*1 left and right plate feet (225L and 225R) are aligned and in contact with shoe 224 at line X-X. Plates 223L and 223R are likewise aligned and coextensive between strike targets 230L and 230R. Line Y-Y defines the distal end of both plates 223L and 223R.

In response to a kick or other blow delivered to right target 230R, both plates 223L and 223R flex leftward as depicted in FIG. 2*d*2. As they flex, the pates slide along one another so that plate foot 225L drops slightly below line X-X and plate foot 225R rises slightly above line X-X. At line Y-Y plate 223R extends slightly beyond Y-Y and plate 223L retracts slightly below Y-Y. The motion of plate feet 225L and 225R is restricted by shoes 224 and/or plate movement governors 226. Shoes 224 and/or plate movement governors 226 absorb much of the force of the kick (or other blow) that was delivered to target 230R. As a result, less force from the blow is transmitted via handle 210 (see FIG. 2*a*) to the hand or wrist of a trainer holding handle 210.

Depicted exemplary strain relief mechanism 222 includes two pieces 223R and 223L that slide against one another.

In some embodiments which include both a strain relief mechanism 220 (e.g. 222) and accelerometer 110, accelerometer 110 corrects output signal 112 to correct for the force absorbed by mechanism 220.

Exemplary Martial Arts Training Evaluation System

Figure 3:
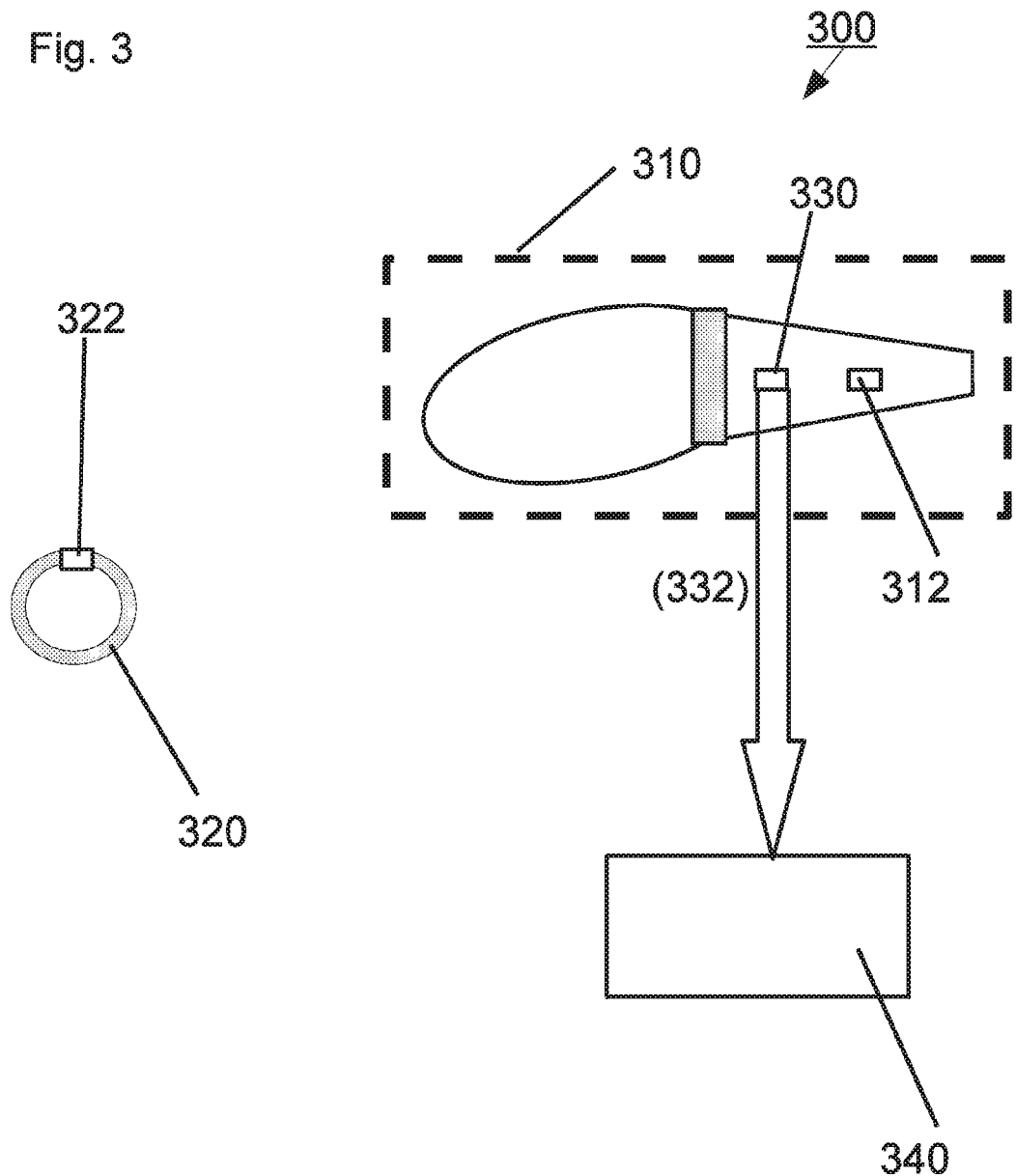
FIG. 3 is a schematic representation of a system according to some exemplary embodiments of the invention.

FIG. 3 is a schematic representation of a system, indicated generally as 300, according to some exemplary embodiments of the invention.

Depicted exemplary system 300 includes one or more hand held targets 310. According to various exemplary embodiments of the invention targets 310 include features described hereinabove in the context of FIGS. 1 and/or 2*a* and/or 2*b* and/or 2*c* and/or 2*d*.

Depicted exemplary system 300 also includes one or more wearable devices 320. According to various exemplary embodiments of the invention wearable devices 320 are configured as bracelets (e.g. FIT-BIT or SAMSUNG GEAR FIT) and/or watches (e.g. APPLE watch or SAMSUNG smart watch) and/or rings and/or belts and/or as tags attachable to such items or other articles of clothing.

Depicted exemplary system 300 also includes trainee log-in hardware (312 and 322) installed in target(s) 310 and wearable device(s) 320 respectively.

For simplicity, a single wearable device 320 and a single target 310 are depicted, although a larger number would typically be present in actual use. In some embodiments many users log in sequentially with one, or a small number, of trainer held targets. Alternatively or additionally, in some embodiments a single user logs in with several trainer held targets concurrently.

In some embodiments trainee log-in hardware (312 and 322) includes near field contact (NFC) hardware. In some embodiments active NFC hardware is installed in target(s) 310 and passive NFC hardware is installed in the wearable device(s) 320. In other exemplary embodiments of the invention, passive NFC hardware is installed in the target(s) 310 and active NFC hardware is installed in the wearable device(s) 320.

In some embodiments target(s) 310 include communication hardware 330 designed and configured to open a channel of communication 332 to an external data processing device 340. According to various exemplary embodiments of the invention external data processing device 340 includes a smart phone and/or laptop and/or wearable device and/or desktop computer and/or tablet device and/or a cloud storage device. In some embodiments external data processing device 340 includes a first device that receives data via channel 332 and relays the data to a second device (e.g. a cloud storage server). According to various exemplary embodiments of the invention channel of communication 332 is wireless or wired. In some embodiments wearable device 320 functions also as device 340.

Exemplary Data Acquisition and Transfer Method

FIG. 4 is a simplified flow diagram of a method for recording an objective evaluation of a martial arts workout, indicated generally as 400, according to some exemplary embodiments of the invention.

Depicted exemplary method 400 includes transmitting 410 altimeter and accelerometer data to a memory associated with a CPU residing in a hand held target. According to various exemplary embodiments of the invention the altimeter data originates from an ultrasound transducer or laser range finder provided in the hand held target. Depicted exemplary method 400 includes storing 420 the data in a log file.

Depicted exemplary method 400 includes associating 430 the log file with a trainee identity acquired by log-in hardware installed in the hand held target to create a trainee log file.

Depicted exemplary method 400 includes transmitting 440 the trainee log file to an external device.

According to various exemplary embodiments of the invention transmitting 440 the trainee log file to an external device relies on NFC (near field contact) and/or IR (Infrared) and/or RF (Radio Frequency) and/or Wi-Fi and/or 3G and/or 4G and/or LTE and/or Bluetooth and/or a physical (wired) connection. Alternatively or additionally, in some embodiments the memory associated with said CPU is an integral memory. Alternatively or additionally, in some embodiments the memory associated with the CPU is a connectable memory (for example a flash drive).

In some embodiments the external device is a wearable device. Alternatively or additionally, in some embodiments associating 430 includes applying a time stamp to the log file. Alternatively or additionally, in some embodiments associating comprises assembling two or more log files belonging to a single trainee into a composite trainee log file.

First Exemplary Use Scenario

Systems and/or targets and/or handles and/or methods described hereinabove are expected to find utility in a variety of martial arts workout settings in which a trainer induces a trainee to deliver a series of blows.

For example, in a we kwon do training session a trainer stands opposite a trainee.

In some embodiments the trainee approaches and brings a wearable device 320 (FIG. 3) bearing log-in hardware 322 into proximity with matching log-in hardware 312 in a target 310 held by the trainer. Proximity causes a log-in event which opens a log file in memory 132 of CPU 130 (FIG. 1). According to some exemplary embodiments of the invention the log file is associated with the name of the trainee. According to these embodiments the trainee name is stored in a memory of log-in hardware 322. In other exemplary embodiments of the invention, the log file is associated with an alphanumeric string. According to these embodiments the alphanumeric string is stored in a memory of log-in hardware 322. Translation of the alphanumeric string to a trainee name is performed later by external device 340. In some embodiments external device 340 communicates with a remote server to perform the translation. In other exemplary embodiments of the invention, wearable device 320 and external device 340 are the same device. According to these embodiments, nether trainee name nor alphanumeric string are required for log-in. According to these embodiments, the system presumes that all training sessions associated with a specific wearable device 320 belong to the same trainee.

In other exemplary embodiments of the invention, the trainer inputs a "start session" command via user input 190 (FIG. 1). According to these embodiments, trainee log-in occurs at the end of the session.

Once log-in is complete, the training session begins. The trainer inputs a command via user interface 190 (FIG. 1). The command input is time stamped and stored in memory 132. The command input also activates a light 172 which propagates light via an optical fiber 170 (or other waveguide) to a trainee facing display 232 (FIG. 2a).

The trainee sees trainee facing display 232 light up. In some embodiments display 232 is side specific with respect to strike target 230 (i.e. Left or Right). The trainee responds by delivering a kick to impact area 234 of strike target 230.

Accelerometer 110 (FIG. 1) registers acceleration caused by the kick and sends a signal 112 to CPU 130 which is time stamped and stored in memory 132 together with height information provided by altimeter 120 as part of signal 122.

Time stamped data concerning trainer inputs and trainee responses in terms of kick strength (as reflected by accelerometer data) and height continues to accumulate in memory 132 throughout the training session in a trainee log file.

According to various exemplary embodiments of the invention the end of a session is marked by an "end session" input provided by the trainer via user input 190 and/or by trainee log-in (log-out in this case) as described hereinabove.

Alternatively or additionally, in some embodiments the trainer sees data on display 160 during the training session. Examples of data that can be displayed include, but are not limited to, strike force (individual or average), delay between trainer input and kick delivery (individual or average) and strike height (individual or average).

At the end of the session the log file, associated with a specific trainee and/or a specific wearable device 320 (FIG. 3) is transmitted via a channel of communication 332 to an external device 340. According to various exemplary embodiments of the invention external device 340 analyzes the log file and/or compares the log file with previous log files from the same trainee and/or compares the log file with performance data from one or more other trainees. Examples of statistics that can are reported according to various exemplary embodiments include, but are not limited to, strike force (individual or average), delay between trainer input and kick delivery (individual or average) and strike height (individual or average). Alternatively or additionally, the log file provide s information on misses. For example, if the trainer provided kick left inputs 3 times at a height of 180 cm or more and none of those inputs were answered with a kick the system can report no impact at 180 cm. Alternatively or additionally, in some embodiments composite data is reported (e.g. strike force as a function of height or strike force as a function of time within the training session).

Second Exemplary Use Scenario

Systems and/or targets and/or handles and/or methods described hereinabove are expected to find utility in a variety of martial arts workout settings in which a trainer induces a trainee to deliver a series of blows.

For example, a boxing trainer stands opposite a trainee.

In some embodiments the trainee approaches and brings a wearable device 320 (FIG. 3) bearing log-in hardware 322 into proximity with matching log-in hardware in a one of two targets 310 held by the trainer. Proximity causes a log-in event as described hereinabove. As described above, in other exemplary embodiments of the invention, the trainer inputs a "start session" command via user input 190 (FIG. 1).

The trainer inputs a command via user interface 190 (FIG. 1). In some embodiments the two targets share a single interface 190. In other exemplary embodiments of the invention, each target has its own interface 190. Alternatively or additionally, in some embodiments a single log-in as described hereinabove and/or a single "start session" command activates both targets. The command input is time stamped and stored in memory 132. The command input also activates a light 172 which propagates light via an optical fiber 170 (or other waveguide) to a trainee facing display 232 (FIG. 2a).

The trainee sees trainee facing display 232 light up. In some embodiments display 232 is side specific with respect to strike target 230 (i.e. Left or Right). The trainee responds by delivering a blow to impact area 234 of strike target 230.

Accelerometer 110 (FIG. 1) registers acceleration caused by the punch and sends a signal 112 to CPU 130 which is time stamped and stored in memory 132 together with height information provided by altimeter 120 as part of signal 122. Time stamped data concerning trainer inputs and trainee responses in terms of punch strength (as reflected by accelerometer data) and height continues to accumulate in memory 132 throughout the training session in a trainee log file. In some embodiments a single log file stores data pertaining to both targets.

According to various exemplary embodiments of the invention the end of a session is marked by an "end session" input provided by the trainer via user input 190 and/or by trainee log-in as described hereinabove.

Alternatively or additionally, in some embodiments the trainer sees data on display 160 during the training session. Examples of data that can be displayed include, but are not limited to, strike force (individual or average), delay between trainer input and punch delivery (individual or average) and strike height (individual or average).

At the end of the session the log file, associated with a specific trainee and/or a specific wearable device 320 (FIG. 3) is transmitted via a channel of communication 332 to an external device 340. According to various exemplary embodiments of the invention external device 340 analyzes the log file and/or compares the log file with previous log files from the same trainee and/or compares the log file with performance data from one or more other trainees. Examples of statistics that can be reported include, but are not limited to, strike force (individual or average), delay between trainer input and punch delivery (individual or average) and strike height (individual or average). Alternatively or additionally, in some embodiments composite data is reported (e.g. strike force as a function of height or strike force as a function of time within the training session).

In some embodiments the targets 310 are equipped with strain relief mechanisms (e.g. 220 in FIG. 2). Optionally, use of a strain relief mechanism contributes to an ability of a small trainer to absorb blows delivered by a larger trainee.

Exemplary Size and Weigh Constraints

Referring again to FIG. 1, altimeter 120, accelerometer 110, CPU 130 and power source 140 are all installed in main body 102 of handle 100. Since handle 100 is to be held, and moved, by a trainer during a training session, this imposes size and weight limitations on each of the components.

For that reason, commercially available components weighing 1, 2, 5, 7 or 10 grams each, or intermediate or lesser numbers of grams, are optionally selected for use in the context of various embodiments of the invention.

For example, in some embodiments the aggregate weight of altimeter 120, accelerometer 110, CPU 130 and power source 140 is less than 50 grams, 40 grams, 30 grams, 20 grams or 10 grams or intermediate or lesser number of grams.

Exemplary Power Source Constraints

In some embodiments power source 140 is a battery. In addition to the weight constraints discussed above, some embodiments require the battery to have sufficient life to power other components through one or more training sessions of 10 minutes, 20 minutes, 30 minutes, 40 minutes, 50 minutes or 60 minutes or intermediate or greater lengths of time.

Alternatively or additionally, batteries with short recharge times relative to the length of a training session are used in some embodiments. For example, a trainer performing 60 minute training sessions can work indefinitely with two we kwon do paddles equipped with handles 100 (FIG. 1) if the recharge time for power source 140 is less than 60 minutes. According to these embodiments, the trainer switches the paddle in her hand for the paddle in the charger at the end of each session.

Alternatively or additionally, in some embodiments configuration of other components of the system contribute to an extension in battery life.

For example, use of low power elements such as LEDs in display 160 and/or light source 172 contributes to a reduction in power consumption that extends battery life. Alternatively or additionally, in some embodiments light source 172 is configured with a duty cycle of less than 100% to further reduce power consumption.

Alternatively or additionally, for example if altimeter 120 transmits signal 122 only in response to an input from user interface 190, power consumption by the altimeter is reduced, contributing to an increase in battery life.

Exemplary Commercially Available Hardware

One example of a commercially available altimeter 120 suitable for use in the context of exemplary embodiments of the invention is TEXAS INSTRUMENTS-PGA450TPWRQ1 (TEXAS INSTRUMENTS; USA). The PGA450-Q1 device is a fully integrated system-on-a-chip analog front-end for ultrasonic sensing and distance measurements.

One example of a commercially available accelerometer 110 suitable for use in the context of exemplary embodiments of the invention is STMICROELECTRONICS LIS3DHTR. The LIS3DH is an ultra-low-power high performance three axes nano accelerometer featuring digital I$^2$C/SPI serial interface standard output. The LIS3DH three axes accelerometer features ultra-low-power operational modes that allow advanced power saving and smart embedded functions. The LIS3DH accelerometer has dynamically user selectable full scales of ±2 g/±4 g/±8 g/±16 g and is capable of measuring applications with output data rates from 1 Hz to 5 kHz.

One example of a commercially available CPU 130 suitable for use in the context of exemplary embodiments of the invention is STMICROELECTRONICS-STM32L152V8T6-A. This Ultra-Low-Power MCU is ARM® Cortex®-M3-based STM32 using ST's ultra-low-leakage process technology with an innovative autonomous dynamic voltage scaling and 5 low-power modes offering platform flexibility to fit any application.

One example of a commercially available power source 140 suitable for use in the context of exemplary embodiments of the invention is a SOSHINE RCR123-3.7-700 (SOSHINE, Shenzhen, and P.R China). This battery provides 700 mAh at 3.7 Volts for up to 6 hours with a recharge time of 2 hours.

Exemplary Materials

In some exemplary embodiments of the invention, shoes 224 and/or governors 226 are constructed of elastomeric polymers. Table 1 summarizes the relevant properties of three commercially available elastomeric polymers (PA 60; PA 80 and PA 100) produced by the PALZIV group in Israel.

TABLE 1

Polymer Properties

| polymer | Density Kg/m3 ISO 845 | Tensile strength kPa ISO 1798 | Elongation % ISO 1798 | Compression 10%; 25%; 50% kPa ISO 844 | Shore A/OO ASTMD2240 |
|---|---|---|---|---|---|
| PA60 | 60 | 572 | 163 | 105; 122; 197 | 70 (OO by ISO868) |
| PA80 | 80 | 957 | 172 | 124; 155; 245 | 25/70 |
| PA100 | 100 | 1476 | 133 | 198; 233; 347 | 70 (A by ISO868) |

In some embodiments PA80 is employed.

Alternatively or additionally, in some embodiments sheets 223 are constructed of nylon and/or polyethylene. According to various exemplary embodiments of the invention thickness is adjusted to achieve the desired degree of flexibility.

Exemplary Advantages

In some embodiments preparation and review of a user log file as described hereinabove contributes to an increase in objectivity of evaluation of trainee performance. For example, the user log file clearly indicate limitations on strike height and/or a tendency to tire after a certain amount of time and/or differences in performance between right side and left side.

Alternatively or additionally, in some embodiments comparison of a user log files as described hereinabove for the same user over a period of time contributes to an increase in objectivity of evaluation of trainee performance improvement.

Alternatively or additionally, in some embodiments comparison of a user log files as described hereinabove for different users contributes to an increase in objectivity of ranking of different trainees. This is useful, for example, in seeding competitors for a competition and/or in identifying well matched opponents for a spectator event.

Alternatively or additionally, in some embodiments installation of a strain release mechanism 220 in a martial arts target 220 contributes to a reduction in damage to the target itself.

Alternatively or additionally, in some embodiments installation of a strain release mechanism 220 in a martial arts target 220 contributes to a reduction in injury to the hand and/or wrist of a trainer holding the target.

It is expected that during the life of this patent many batteries, altimeters and accelerometers and flexible polymers will be developed and the scope of the invention is intended to include all such new technologies a priori.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

Specifically, a variety of numerical indicators have been utilized. It should be understood that these numerical indicators could vary even further based upon a variety of engineering principles, materials, intended use and designs incorporated into the various embodiments of the invention. Additionally, components and/or actions ascribed to exemplary embodiments of the invention and depicted as a single unit may be divided into subunits. Conversely, components and/or actions ascribed to exemplary embodiments of the invention and depicted as sub-units/individual actions may be combined into a single unit/action with the described/depicted function.

Alternatively, or additionally, features used to describe a method can be used to characterize an apparatus and features used to describe an apparatus can be used to characterize a method.

It should be further understood that the individual features described hereinabove can be combined in all possible combinations and sub-combinations to produce additional embodiments of the invention. The examples given above are exemplary in nature and are not intended to limit the scope of the invention which is defined solely by the following claims.

Each recitation of an embodiment of the invention that includes a specific feature, part, component, module or process is an explicit statement that additional embodiments of the invention not including the recited feature, part, component, module or process exist. Specifically, the invention has been described in the context of we kwon do and boxing but might also be used in kick boxing, karate and other martial arts training.

All publications, references, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The terms "include", and "have" and their conjugates as used herein mean "including but not necessarily limited to".

The invention claimed is:

1. A martial arts training system comprising:
   (a) at least one hand held target comprising:
      an accelerometer providing a first data output signal;
      an altimeter providing a second data output signal;
      a CPU receiving and storing said first and second data output signals;
   (b) at least one wearable devices; and (c) trainee log-in hardware installed in said at least one target and said at least one wearable device configured to generate a log file associated with a trainee identity, wherein said first and second data output signals are associated with said log file.

2. A system according to claim 1, wherein said trainee log-in hardware includes near field contact (NFC) hardware.

3. A system according to claim 2, wherein active NFC hardware is installed in said at least one target and passive NFC hardware is installed in said at least one wearable device.

4. A system according to claim 2, wherein passive NFC hardware is installed in said at least one target and active NFC hardware is installed in said at least one wearable device.

5. A system according to claim 1, wherein said at least one target comprises communication hardware that opens a channel of communication to an external data processing device.

* * * * *